United States Patent
Wang et al.

(10) Patent No.: US 6,266,092 B1
(45) Date of Patent: Jul. 24, 2001

(54) METHOD AND APPARATUS FOR VIDEO LINE MULTIPLICATION WITH ENHANCED SHARPNESS

(75) Inventors: Zhongde Wang, North York; Steve Selby, Scarborough; Lance Greggain, Woodbridge, all of (CA)

(73) Assignee: Genesis Microchip Inc. (CA)

( * ) Notice: Subject to any disclaimer, the term of this patent is extended or adjusted under 35 U.S.C. 154(b) by 0 days.

(21) Appl. No.: 09/075,836

(22) Filed: May 12, 1998

(51) Int. Cl.[7] .................................. H04N 7/01; H04N 5/21
(52) U.S. Cl. ........................ 348/448; 345/441; 345/625; 345/910; 345/911
(58) Field of Search ......................... 348/448, 441, 348/445, 447, 458, 459, 625, 252, 910, 911; 382/266, 269, 275, 300; 358/532, 447; H04N 7/01, 5/21

(56) References Cited

U.S. PATENT DOCUMENTS

| | | | |
|---|---|---|---|
| 3,920,889 | 11/1975 | Connor | 348/625 |
| 4,789,893 | 12/1988 | Weston | 348/448 |
| 4,792,854 | 12/1988 | Glenn | 358/160 |
| 4,837,619 * | 6/1989 | Tsinberg | 358/140 |
| 4,941,045 * | 7/1990 | Birch | 358/140 |
| 5,046,164 * | 9/1991 | Hurst, Jr. | 358/140 |
| 5,049,998 * | 9/1991 | Lee | 358/166 |
| 5,150,214 * | 9/1992 | Shin et al. | 356/166 |
| 5,227,883 | 7/1993 | Dischert et al. | 358/160 |
| 5,446,498 * | 8/1995 | Boon | 348/448 |
| 5,475,438 * | 12/1995 | Bretl | 348/452 |
| 5,621,470 * | 4/1997 | Sid-Ahmed | 348/448 |
| 5,625,421 * | 4/1997 | Faroudja et al. | 348/448 |
| 5,668,602 * | 9/1997 | Sid-Ahmed | 348/448 |
| 5,689,305 * | 11/1997 | Ng et al. | 348/448 |
| 5,694,177 * | 12/1997 | Flannaghan et al. | 348/607 |
| 5,808,688 * | 9/1998 | Sung | 348/441 |
| 6,040,869 * | 3/2000 | Dischert | 348/448 |

FOREIGN PATENT DOCUMENTS

| | | |
|---|---|---|
| 0 266 079 | 5/1988 | (EP) . |
| 0 529 761 | 3/1993 | (EP) . |

OTHER PUBLICATIONS

Dubois, Eric, "The Sampling and Reconstruction of Time–Varying Imagery with Application in Video Systems," Proc. IEEE v.73 (4), pp. 502–522 (Apr. 1985).

* cited by examiner

Primary Examiner—Reinhard J. Eisenzopf
Assistant Examiner—Jean W. Désir

(57) ABSTRACT

A method of de-interlacing used to convert an interlaced video signal to a progressively scanned format utilizing vertical temporal filtering to generate the missing lines, utilizing appropriate filter coefficients to give a desired vertical frequency response, and filter utilizing coefficients such that the total combined contribution from all fields is unity while the total contribution from each individual field is chosen so as to boost higher temporal frequencies which has the perceived effect of increasing the sharpness of moving edges. Furthermore, in order to avoid certain unwanted artifacts, the lines of the current field are modified using a vertical temporal filter with similar temporal boosting properties to that which was used to generate the missing lines.

37 Claims, 8 Drawing Sheets

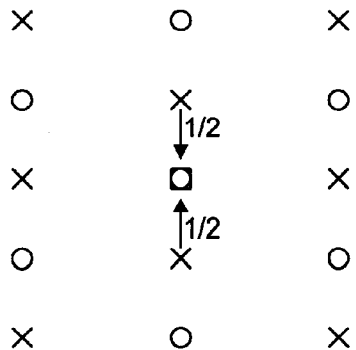
FIG. 1A
PRIOR ART
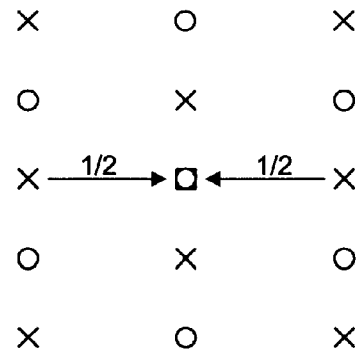
FIG. 1B
PRIOR ART
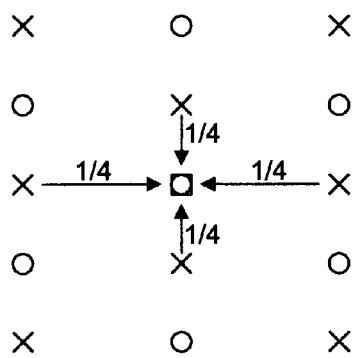
FIG. 1C
PRIOR ART
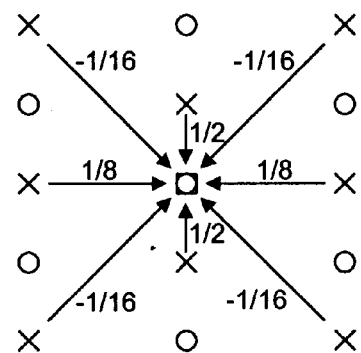
FIG. 1D
PRIOR ART
× INPUT LINES
○ INTERPOLATED MISSING LINES
□ 'CURRENT' MISSING LINE
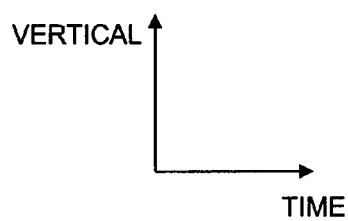

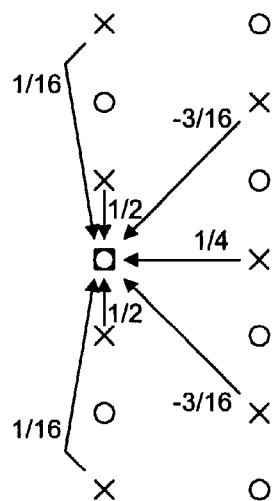
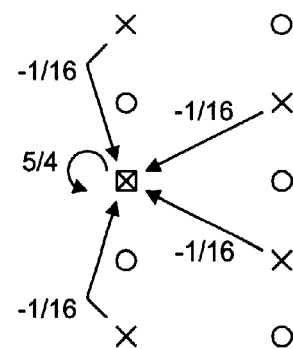
FIG. 3A                FIG. 3B
× INPUT LINES
○ INTERPOLATED MISSING LINES
□ 'CURRENT' MISSING LINE
⊠ MODIFIED INPUT LINE
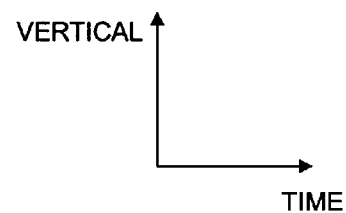

FIG. 4A

| 0 | 0 | 0 | 100 | 100 | 100 | 100 |
|---|---|---|---|---|---|---|
| 0 | 0 | 0 | 100 | 100 | 100 | 100 |
| 0 | 0 | 0 | 100 | 100 | 100 | 100 |
| 0 | 0 | 0 | 100 | 100 | 100 | 100 |

FIG. 4B

| 0 | 0 | 0 | 0 | 100 | 100 | 100 |
|---|---|---|---|---|---|---|
| 0 | 0 | 0 | 0 | 100 | 100 | 100 |
| 0 | 0 | 0 | 0 | 100 | 100 | 100 |
| 0 | 0 | 0 | 0 | 100 | 100 | 100 |

FIG. 4C

| 0 | 0 | 0 | 100 | 100 | 100 | 100 |
|---|---|---|---|---|---|---|
| 0 | 0 | 0 | 112½ | 100 | 100 | 100 |
| 0 | 0 | 0 | 100 | 100 | 100 | 100 |
| 0 | 0 | 0 | 112½ | 100 | 100 | 100 |
| 0 | 0 | 0 | 100 | 100 | 100 | 100 |
| 0 | 0 | 0 | 112½ | 100 | 100 | 100 |
| 0 | 0 | 0 | 100 | 100 | 100 | 100 |
| 0 | 0 | 0 | 112½ | 100 | 100 | 100 |

FIG. 4D

| 0 | 0 | 0 | 112½ | 100 | 100 | 100 |
|---|---|---|---|---|---|---|
| 0 | 0 | 0 | 112½ | 100 | 100 | 100 |
| 0 | 0 | 0 | 112½ | 100 | 100 | 100 |
| 0 | 0 | 0 | 112½ | 100 | 100 | 100 |
| 0 | 0 | 0 | 112½ | 100 | 100 | 100 |
| 0 | 0 | 0 | 112½ | 100 | 100 | 100 |
| 0 | 0 | 0 | 112½ | 100 | 100 | 100 |
| 0 | 0 | 0 | 112½ | 100 | 100 | 100 |

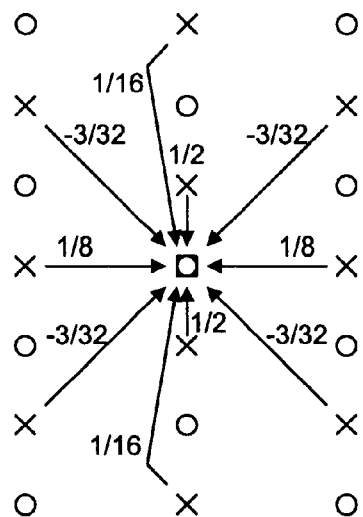
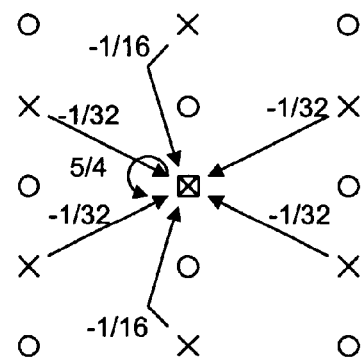
FIG. 5A  FIG. 5B
× INPUT LINES
○ INTERPOLATED MISSING LINES
□ 'CURRENT' MISSING LINE
⊠ MODIFIED INPUT LINE
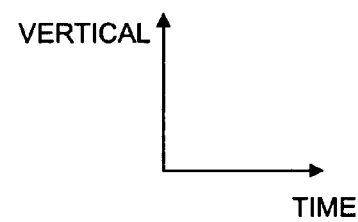

METHOD AND APPARATUS FOR VIDEO LINE MULTIPLICATION WITH ENHANCED SHARPNESS

FIELD OF THE INVENTION

This invention relates in general to digital video signal processing, and more particularly to a method and apparatus for converting an interlaced video signal to a progressively scanned format in which the perceived sharpness of moving edges is enhanced.

BACKGROUND OF THE INVENTION

Most television systems utilize signals which have been generated by scanning a source image in a 2:1 interlaced format. Many display devices are available which are capable of reproducing such images directly from the interlaced signal. For instance, in a CRT monitor, the interlaced signal may be used directly to modulate the intensity of a beam as it is swept across the screen in an interlaced raster format. Such displays, however, may suffer from artifacts such as visible line structure, flicker and twitter which are related to the interlaced nature of the scanning. In particular, these undesirable artifacts tend to become more noticeable for screens with larger diagonal sizes. It is often desirable to convert signals from an interlaced scan format to a progressive scan format in order to reduce the artifacts associated with interlaced scanning. Furthermore, some display devices are inherently progressive in nature and therefore require conversion to a progressive format before display is possible.

A number of solutions to the problem of conversion from interlaced to progressive scan format have been proposed in the prior art. One such method involves the simple merging of two interlaced video fields to produce a progressively scanned video frame in which the even lines come from the even field and the odd lines come from the odd field. This technique works well for sequences which contain little or no motion but results in objectionable artifacts when motion is present due to the simultaneous display of video data which represents the image at different points in time.

Various forms of spatial and/or temporal interpolation have also been proposed. One such method involves spatial interpolation within a single interlaced field in order to produce a progressive frame. This approach does not suffer from the motion artifacts described above but, among other problems, suffers from a loss of vertical detail since each field contains only half of the spatial picture data. Alternatively, it is also possible to generate the missing lines by means of purely temporal interpolation. This approach yields maximum vertical detail for static images but results in serious blur when motion is present. Various attempts have also been made to combine spatial and temporal interpolation in order to reap the benefits of both approaches. As described in U.S. Pat. No. 4,789,893 (Weston), it is possible to generate the missing lines as a weighted average of neighboring lines from both the current and adjacent fields. The weightings applied to each of the neighboring lines are chosen such that low vertical frequency components are contributed mainly by the current field and higher vertical frequency components are contributed partly by the current field and partly by the adjacent fields. This approach has the benefit that vertical resolution is enhanced at low temporal frequencies by the contribution from the adjacent fields, however, for higher temporal frequencies the contribution from the adjacent fields actually reduces the vertical resolution. Although this last method does not suffer from motion blur artifacts, it has been found that further enhancement of the image is possible. According to the present invention, a method is provided whereby the apparent sharpness of moving detail may be enhanced in both spatial dimensions.

The following patents are relevant as prior art relative to the present invention:

| U.S. Pat. Documents | | |
| --- | --- | --- |
| 4,789,893 - Weston | Dec 6/88 | Interpolating lines of video signals |
| 3,920,889 - Connor | Nov 18/75 | Method and apparatus for crispening video signals by the use of temporal filters |
| 4,792,854 - Glenn | Dec 20/88 | Apparatus for temporally processing a video signal |
| 5,227,883 - Dischert et al. | Jul 13/93 | Method and apparatus for motion aperture correction |

SUMMARY OF THE INVENTION

According to the present invention, a method and apparatus are provided for converting an interlaced video image into a progressively scanned image by way of vertical temporal processing while enhancing the apparent sharpness of moving edges. According to the invention, missing lines are generated as a weighted average of neighboring lines from both the current and adjacent fields. The weightings are chosen such that the contribution from the current field is greater than unity, the combined contribution from all adjacent fields is negative and the total combined contribution from all fields is unity. In this way, the response to high temporal frequencies is boosted which has the effect of increasing the perceived sharpness of moving edges. Whereas if the contribution of the adjacent fields were to sum to zero as in some prior art approaches, then the interpolated lines could be merged with the unmodified lines of the current field without certain unwanted motion artifacts, in the present invention it becomes necessary to replace the lines of the current field with a weighted average of neighboring lines from both the current and adjacent fields such that the total contribution from each field is the same as the total contribution from each field used to generate the missing lines.

BRIEF DESCRIPTION OF THE DRAWINGS

A description of the prior art and of the preferred embodiment of the present invention is provided hereinbelow with reference to the following drawings in which:

FIG. 1A is a schematic representation of how missing video lines may be derived by means of vertical interpolation, according to the prior art.

FIG. 1B is a schematic representation of how missing video lines may be derived by means of temporal interpolation, according to the prior art.

FIG. 1C is a schematic representation of how missing video lines may be derived by means of combined vertical and temporal interpolation in which the total contribution from the adjacent fields is substantially positive, according to the prior art.

FIG. 1D is a schematic representation of how missing video lines may be derived by means of combined vertical and temporal interpolation in which the total contribution from the adjacent fields is substantially zero, according to the prior art.

FIG. 3A is a schematic representation of how missing video lines are derived using one of the preferred embodiments of the present invention.

FIG. 3B is a schematic representation of how the lines of the current field are modified using one of the preferred embodiments of the present invention.

FIG. 4A is a schematic representation of a current input video field in which exists a vertically oriented edge.

FIG. 4B is a schematic representation of the next input video field in which the vertically oriented edge has moved one pixel to the right.

FIG. 4C is a schematic representation of combining the missing video lines which are generated using the method of FIG. 3A with the unmodified lines of the current field.

FIG. 4D is a schematic representation of combining the missing video lines which are generated using the method of FIG. 3A with the lines of the current field which have been modified using the method of FIG. 3B.

FIG. 5A is a schematic representation of how missing video lines are derived using a second embodiment of the present invention.

FIG. 5B is a schematic representation of how the lines of the current field are modified using a second embodiment of the present invention.

DESCRIPTION OF THE PREFERRED EMBODIMENTS

In the following description, the specific case of line doubling is used to illustrate the methods of the prior art and of the present invention. However, the techniques described may be extended to other ratios of output lines to input lines including non-integer multiples.

Figure 2:
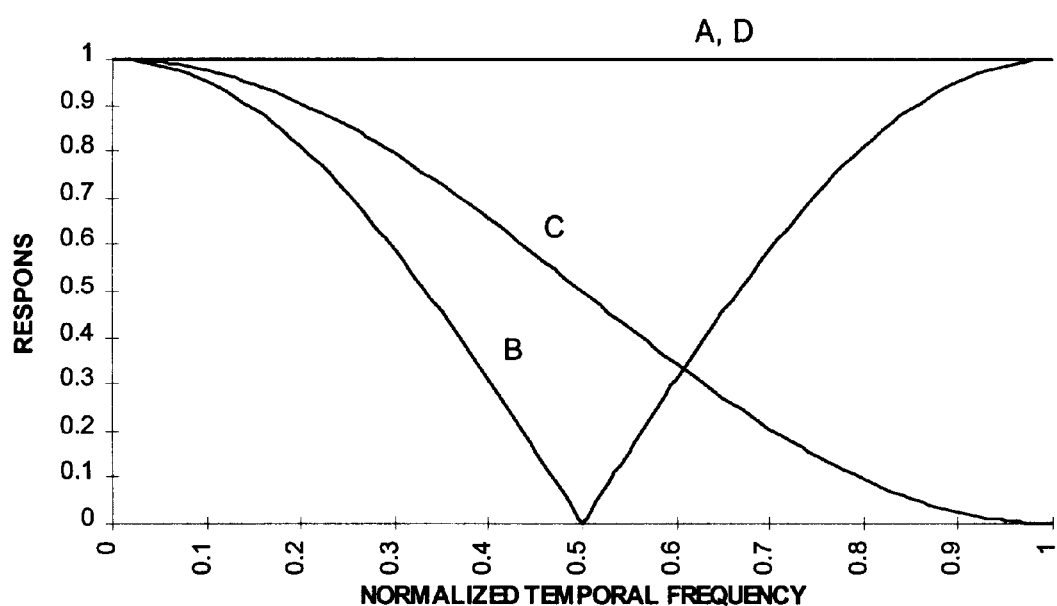
FIG. 2 is a plot of the temporal frequency responses of the various prior art methods shown in FIGS. 1A–1D.

For the case of line doubling, progressively scanned frames are typically produced by combining the lines of the current field with interpolated lines which fall spatially between the lines of the current field. The interpolated or 'missing' lines have, in the prior art, been generated using a variety of techniques. Turning to FIG. 1A, an example is shown of how missing video lines may be generated using vertical interpolation. In this example, the missing lines are generated as the average of the lines above and below each missing line. The vertical frequency response associated with this method rolls off faster than with some other methods described below, resulting in a loss of vertical detail. The temporal frequency response associated with this method is flat since there is no contribution from any field other than the current one. For completeness, the temporal response is illustrated in FIG. 2 by the flat line identified by reference A.

In FIG. 1B, an example is shown of how missing video lines may be generated using temporal interpolation. In this example, the missing lines are generated as the average of the lines in the two adjacent fields which are spatially coincident with each missing line. The vertical frequency response associated with this approach is flat when there is no motion between fields and thus all vertical detail is preserved. When motion is present, however, significant blur will occur since the output is produced by averaging samples which represent the image at different points in time. This motion blur corresponds with a roll off in the temporal response as illustrated by the line B in FIG. 2.

FIG. 1C shows an example of how vertical and temporal interpolation may be combined. In this example, the missing lines are generated as the average of the lines in the two adjacent fields which are spatially coincident with each missing line and of the current lines above and below. This method represents a compromise between purely vertical and purely temporal interpolation. As a result, this method has some of the benefits of both approaches but also some of the disadvantages of both, such as motion blur. Since this method involves processing in both the spatial and temporal dimensions, the frequency response is also two dimensional. A plot of the temporal frequency response corresponding to zero vertical frequency is shown as line C in FIG. 2. As with the previous method, the occurrence of motion blur is suggested by the roll off in the temporal response.

The method shown in FIG. 1D is a somewhat more sophisticated approach to combining the benefits of vertical and temporal interpolation as described in U.S. Pat. No. 4,789,893 (Weston). In this approach, the missing lines are generated as a weighted average of neighboring pixels in the current and adjacent fields. The weightings are chosen such that low vertical frequencies are contributed mainly from the current field and high vertical frequencies are contributed partly from the current field and partly from the adjacent field. In order for this to be satisfied and in order to minimize motion blur, the weights of the adjacent fields sum to zero while the weights of the current field sum to unity. At low temporal frequencies, the vertical response owing to the contribution from the current field is boosted by the contribution from the adjacent fields, hence vertical detail is enhanced. At high temporal frequencies corresponding to vertical motion, the vertical response is reduced by the contribution from the adjacent fields. Hence, vertical detail is reduced. A plot of the temporal frequency response corresponding to zero vertical frequency is shown by the line D in FIG. 2. The temporal response in this case is flat (i.e. equivalent to the flat line response A in FIG. 2) since the total contribution from the adjacent fields is zero and such that motion blur does not occur.

In all of the prior art methods described above, the temporal response is either flat and therefore relatively free from motion artifacts, or rolls off at higher temporal frequencies resulting in motion blur artifacts. Subjective testing has shown that increased sharpness of moving image detail is often found to be more pleasing to viewers than images without such enhanced sharpness. According to the present invention, the apparent sharpness of moving edges is enhanced by boosting the response at higher temporal frequencies. FIG. 3A shows how the missing video lines are generated according to the preferred embodiment of the present invention. The weightings are chosen such that appropriate contributions are derived from each field in order to give the desired vertical frequency response. The temporal response is achieved by selecting the weightings such that the contribution from the current field is greater than unity, the contribution from the adjacent field is negative and the combined contribution from both fields is unity. The fact that the combined contribution from both fields sums to unity ensures that the average luminance of the image is preserved.

As a consequence of the fact that the total contribution from the current field does not sum to unity, it is not desirable to simply merge the interpolated missing lines with the lines from the current field as is possible with the system shown in FIG. 1D. FIG. 4 illustrates the problem which arises if such line merging were to be performed. FIG. 4A shows a field of interlaced video within which exists a vertically oriented edge. FIG. 4B shows the subsequent field in which the vertically oriented edge has moved one pixel to the right. FIG. 4C shows the result of combining the interpolated missing lines which are derived by the method depicted in FIG. 3A with the lines of the current field. It will be noted that the pixel values shown in FIG. 4C will result in the appearance of a serrated edge. When viewed as a moving sequence, this artifact detracts substantially from the perceived image quality. FIG. 4D shows the result of combining the interpolated missing lines which are derived using the method depicted in FIG. 3A, with the lines of the current field which have been modified according to the method shown in FIG. 3B. It can be seen that the serration effect does not occur when this technique is employed. The weightings used to modify the lines of the current field are chosen such that the total contribution from each field is substantially equal to the corresponding contribution from each field which was used to generate the interpolated missing lines. In this way, an equal amount of temporal boosting is applied to both the missing and current lines.

The methods shown in FIG. 3A and FIG. 3B use contributions from the current input video field and the next occurring adjacent field to produce an output frame. Although this method may produce acceptable results, at times it may be desirable to use contributions from the current field and the adjacent earlier field. It may also be desirable to use more than two input video fields to produce an output frame in order to achieve the desired temporal response. FIG. 5A shows how the missing video lines are generated in a second embodiment of the present invention in which contributions are taken from three input video fields to produce an output frame. As in the first embodiment, the weightings are chosen such that appropriate contributions are derived from each field in order to give the desired vertical frequency response. The temporal response is achieved by selecting the weightings such that the contribution from the current field is greater than unity, the combined contribution from the two adjacent fields is negative and the total contribution from all fields is unity. FIG. 5B shows how the lines of the current field are modified in the second embodiment of the present invention in order to avoid an effect similar to that illustrated in FIG. 4C in which vertically oriented edges which move horizontally may appear serrated. As in the first embodiment, the weightings used to modify the lines of the current field are chosen such that the total contribution from each field is substantially equal to the corresponding contribution from each field which was used to generate the interpolated missing lines.

Figure 6:
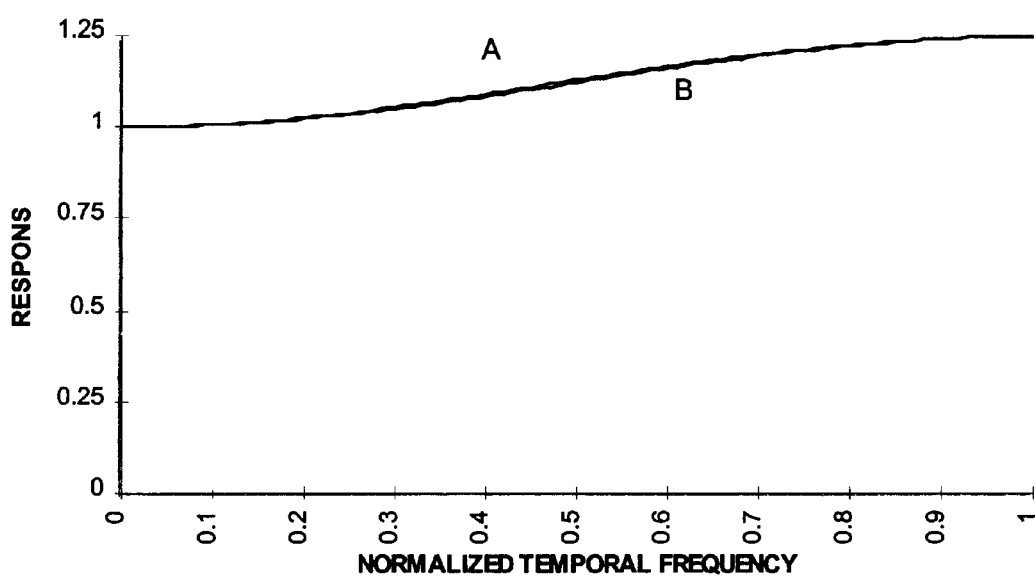
FIG. 6 is a plot of the temporal frequency responses of the methods shown in FIG. 3A and FIG. 3B and in FIG. 5A and FIG. 5B.

The line A in FIG. 6 shows the temporal frequency response corresponding to zero vertical frequency for the combined methodologies in FIG. 3A and FIG. 3B. The response increases for higher temporal frequencies and thus the apparent sharpness of moving edges is enhanced regardless of whether the motion is in the horizontal direction or vertical direction or a combination of both. The line B in FIG. 6 shows the temporal frequency response corresponding to zero vertical frequency for the combined methodologies in FIG. 5A and FIG. 5B. The responses illustrated by line A and line B are only slightly different and may appear indistinguishable. Line A is the higher of the two.

FIG. 3A and FIG. 3B show how the method of the present invention may be applied to a single video channel. It is common, however, for a colour video signal to be split into several components and represented using multiple video channels. For instance, video systems often utilize a single channel to carry luminance information and two other channels to carry chrominance information. In such a case, it may be desirable to apply different levels of temporal boosting in the luminance and chrominance channels in order to avoid colour aberrations.

Figure 7:
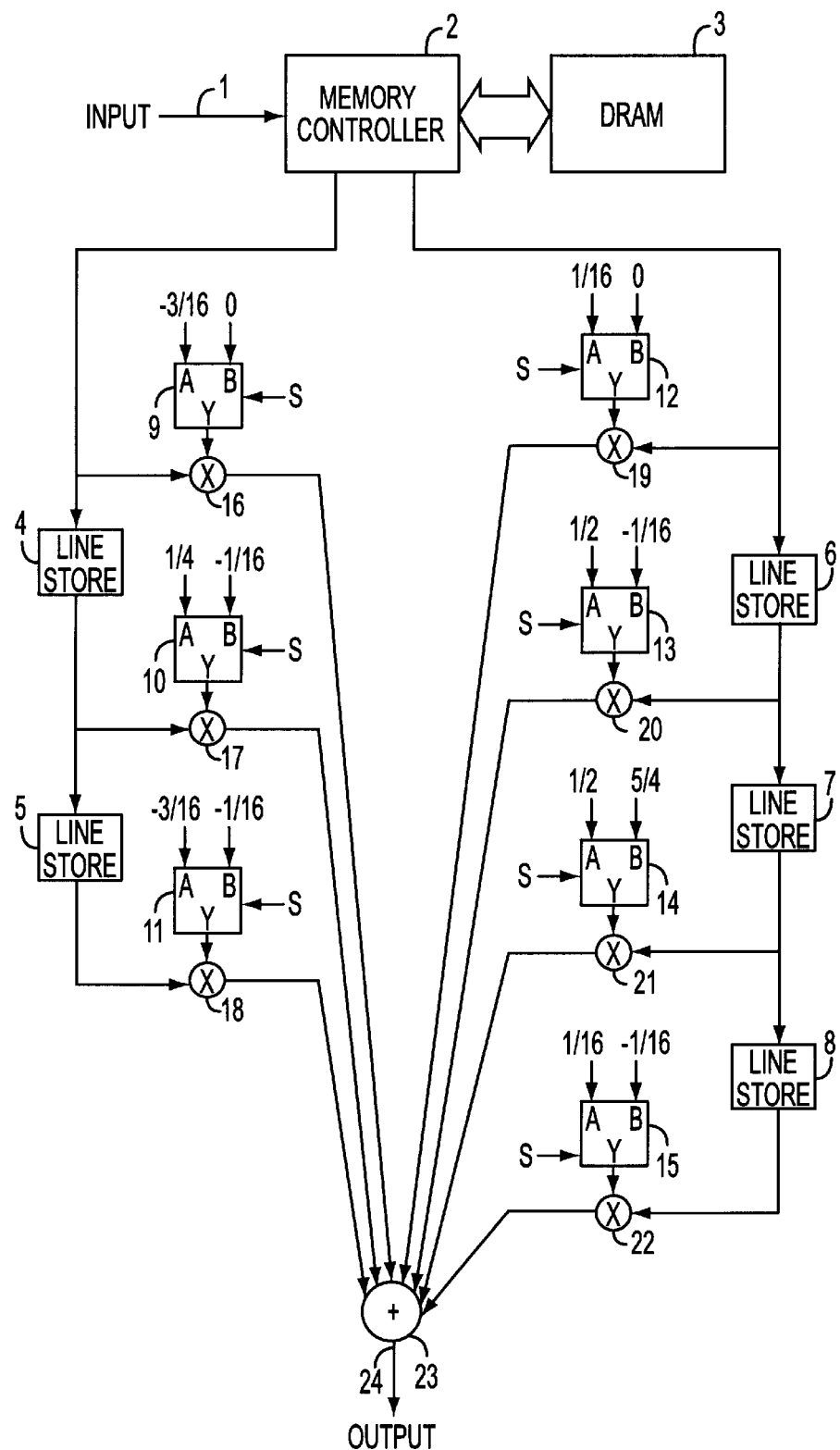
FIG. 7 is a block diagram of an apparatus for implementing the method according to the preferred embodiment of the present invention.

The method of the present invention which is shown in FIG. 3A and FIG. 3B can be implemented using an arrangement of storage elements, multiplexers, and arithmetic elements as shown in FIG. 7. As each field of an interlaced video signal 1 arrives at the input to a memory controller 2, it is written into a memory 3. Concurrently with the operation of writing data into memory, data from the previous field is retrieved from memory and applied to the input of line store element 6 and multiplier 19 while data from the most recently received field is routed through the memory controller and applied to the input of line store element 4 and multiplier 16. In an alternative mode of operation, data from the most recently received field may be retrieved from memory and applied to the input of line store element 4 and multiplier 16 rather than being routed directly through the memory controller. As new data is stored in line store 4, the previously stored data is output and applied to the input of line store 5 where it replaces the data which was previously there. In a similar fashion, the data in line store 6 replaces the data in line store 7 which replaces the data in line store 8. Data which is placed into any line store will remain there for one input line period which is equal to two output line periods before it is replaced by new data. During the first output line period, a selector signal S causes multiplexers 9–15 to select a first set of coefficients which are connected to the A side of each multiplexer and which are used to generate the interpolated missing lines. During the second output line period, the selector signal causes an alternate set of coefficients which are connected to the B side of each multiplexer to be selected, which are used to modify the existing lines. The selector signal S may be generated by a controller (not shown) in a well known manner. Regardless of which set of coefficients is selected, the coefficients which appear at the outputs of multiplexers 9–15 are applied to one of the inputs of each of multipliers 16–22, respectively. The other input of each multiplier 17, 18 and 20–22 is driven by the outputs of line stores 4–8, respectively. When the outputs from multipliers 16–22 are summed together using adder 23, the output 24 is the desired progressively scanned video signal.

Figure 8:
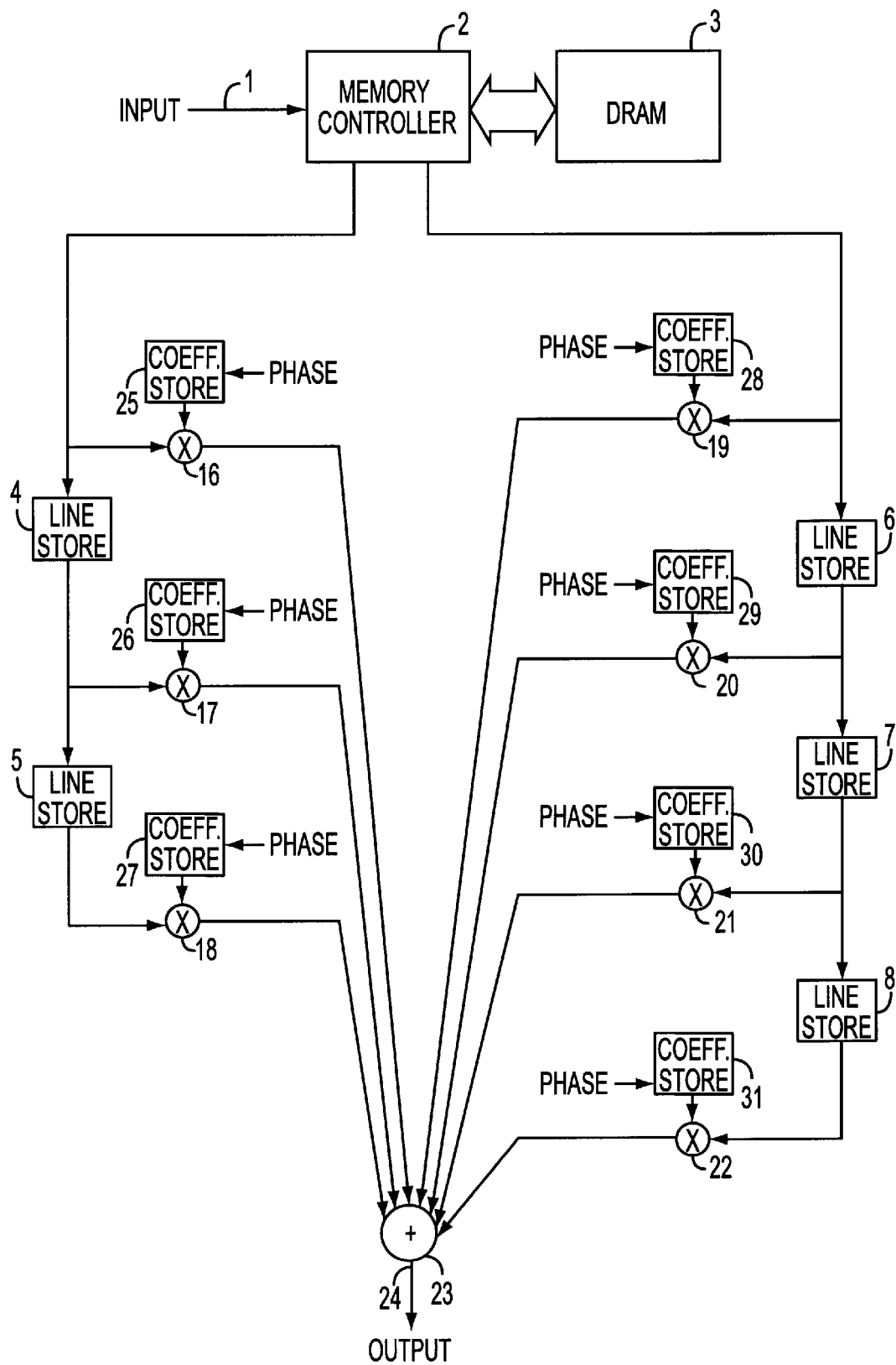
FIG. 8 is a block diagram of an apparatus according to an alternative but equally preferable embodiment for implementing the method of the present invention and for performing arbitrary vertical scaling.

The foregoing description of a preferred embodiment of the system of the present invention is not restricted to the specific best mode set forth herein. Indeed, the flexible nature of software programming is such that the broad concepts of the invention may be implemented using software rather than hardware as set forth herein. Also, as indicated above, the principles of the invention are not limited to the specific case of line doubling. An obvious extension of this method would be to combine the method of the present invention with additional operations such as scaling in order to produce a greater or lesser number of lines. Furthermore, such scaling may include scaling by a non-integer multiple and could either be implemented using a separate processing stage or could be combined with the method of the present invention and implemented using a single composite structure. In the latter case, the coefficients may be split into a number of phases corresponding to an equal number of spatial regions which fall between the input video lines. When an output line must be generated which falls within a given spatial region, the coefficient set which corresponds to that phase is selected. As taught by the present invention, each set of coefficients corresponding to a unique phase should satisfy the property that the contribution from the current field is greater than unity, the combined contribution from all adjacent fields is negative and the total contribution from all fields is unity. FIG. 8 shows an apparatus for implementing the above method in which coefficients are split into phases to enable interpolation at arbitrary positions. The apparatus is similar to that shown in FIG. 7 except that multiplexers 9–15 have been replaced by coefficient storage banks 25–31. All of the phases for each filter tap are stored within an associated local coefficient storage bank. Depending on the desired spatial position of the output video line, the phase selector signal PHASE which is generated by a controller (not shown) in a well known manner, is used to address the appropriate set of coefficients.

The weightings shown in FIG. 3A and FIG. 3B comprise only one of the possible embodiments of the present invention and many other variations are possible. For instance, the weightings could be chosen to result in a greater or lesser amount of temporal boosting. Similarly, the weightings could be adjusted to modify the frequency response in the vertical dimension to achieve a desired characteristic. Furthermore, additional operations on the data which might otherwise be performed separately, could be performed by adjusting the coefficients so as to combine the additional operation with the method of the present invention. The adjustment of contrast is an example of an additional operation which could easily be implemented with only minor modification to the method of the present invention. Such an operation would be equivalent to scaling of the coefficients by a real number. In addition, contributions from a different number of lines in each field other than the number shown in the illustrative examples herein above could also be used. Among other variations, it would also be possible for contributions to be taken from a greater number of fields than shown in the examples. Any of the above variations are believed to be within the scope of this invention as defined by the claims appended hereto.

We claim:

1. Apparatus for generating an interpolated line of video, comprising first means for multiplying data from video lines on opposite sides of said interpolated line in a video field by first predetermined coefficients and in response generating a first plurality of product signals, second means for multiplying data from video lines in one or more adjacent video fields by further predetermined coefficients and in response generating a plurality of further product signals, and means for summing said first and further product signals to generate said interpolated line of video which is a weighted average of said data in said video lines of said video field and said one or more adjacent video fields, and wherein said coefficients are chosen such that a first contribution from said video field is greater than a first predetermined value, a further contribution from said one or more adjacent video fields is negative and the total contribution from all video fields sums to said first predetermined value.

2. The apparatus of claim 1, further including means for modifying a video line of said video field by multiplying data from each said line and lines on opposite sides thereof within said video field by first additional coefficients and in response generating a first plurality of additional product signals and multiplying data from video lines of said one or more adjacent video fields by further additional coefficients and in response generating a further plurality of additional product signals and summing said first and further additional product signals so as to generate a modified line of video which is a weighted average of said data in said video lines of said video field and said one or more adjacent video fields, wherein said additional coefficients are chosen such that the contribution from said video field is equal to said first contribution and the contribution from said one or more additional video fields is equal to said further contribution.

3. The apparatus of claim 2, wherein said first means comprises a first plurality of multipliers and intermediate line storage means for multiplying data from video lines on opposite sides of said interpolated line in said video field by said first predetermined coefficients, said second means comprises a second plurality of multipliers and intermediate line storage means for multiplying data from said video lines in said one or more adjacent video fields by said further predetermined coefficients, and said means for summing comprises a multiple input summer connected to respective outputs of said multipliers.

4. The apparatus of claim 3, wherein said means for modifying further comprises a first plurality of multiplexers associated with said video field having first inputs for receiving said first predetermined coefficients, second inputs for receiving said first additional coefficients and outputs connected to respective ones of said first plurality of multipliers, and a second plurality of multiplexers associated with said one or more adjacent video fields having first inputs for receiving said further predetermined coefficients, second inputs for receiving said further additional coefficients, and outputs connected to respective ones of said second plurality of multipliers.

5. The apparatus of claim 4, further comprising a random access memory for storing said data in said video lines of said video field and said one or more adjacent video fields and a memory controller for writing said data to said random access memory and reading said data from said random access memory for application to at least one of said first and second pluralities of multipliers and intermediate line storage means.

6. The apparatus of claim 3, wherein said means for modifying further comprises a plurality of coefficient storage banks connected to respective ones of said multipliers for storing and applying said coefficients to said multipliers.

7. The apparatus of claim 6, wherein each of said coefficient storage banks stores a plurality of selectable sets of said coefficients for application to said multipliers for enabling line interpolation in spatial regions between said video lines.

8. The apparatus of claim 7, further comprising a random access memory for storing said data in said video lines of said video field and said one or more adjacent video fields and a memory controller for writing said data to said random access memory and reading said data from said random access memory for application to at least one of said first and second pluralities of multipliers and intermediate line storage means.

9. The apparatus of claim 1, wherein said predetermined value is one.

10. A video line generating apparatus, comprising:
 a first multiplier generating first product signals by multiplying data from first video lines in a first video field by predetermined first coefficients summing to a first value greater than a predetermined value;

a second multiplier generating second product signals by multiplying data from video lines in one or more adjacent video fields by predetermined second coefficients summing to a negative second value, the first and second coefficients together summing to the predetermined value; and a first adder generating an interpolated video line by summing the first and second product signals.

11. The apparatus of claim 10, further comprising a video line modifier modifying a specific video line in the first video field, said video line modifier comprising:

a third multiplier generating a first plurality of additional product signals by multiplying data from each of a specified plurality of video lines by first additional coefficients summing to the first value, the specified plurality of video lines comprising the specific video line and video lines on opposite sides thereof in the first video field;

a fourth multiplier generating a further plurality of additional product signals by multiplying data from video lines in the one or more adjacent video fields by further additional coefficients summing to the second value; and a second adder generating a modified video line, as a weighted average of the data in the specified plurality of video lines and the video lines of the one or more adjacent video fields, by summing the first additional and further additional product signals.

12. The apparatus of claim 11, wherein:

said first multiplier comprises a first plurality of multiplier stages and one or more first intermediate line storages;

said second multiplier comprises a second plurality of multiplier stages and one or more second intermediate line storages; and said first adder comprises a multiple input summer having inputs connected to respective outputs of said first and second multipliers.

13. The apparatus of claim 12, wherein said video line modifier further comprises:

a first plurality of multiplexers associated with the first video field and having first inputs for receiving the first predetermined coefficients, second inputs for receiving the first additional coefficients, and outputs connected to respective ones of the first plurality of multiplier stages; and a second plurality of multiplexers associated with the one or more adjacent video fields and having first inputs for receiving the further predetermined coefficients, second inputs for receiving the further additional coefficients, and outputs connected to respective ones of the second plurality of multiplier stages.

14. The apparatus of claim 13, further comprising:

a memory for storing the data of the specified plurality of video lines and the video lines of the one or more adjacent video fields; and a memory controller for writing the data to said memory and reading the data from said memory for application to at least one of the first and second pluralities of multiplier stages and the first and second one or more intermediate line storages.

15. The apparatus of claim 12, wherein said video line modifier further comprises a plurality of coefficient storage banks connected to respective ones of said multipliers for storing and applying the respective coefficients thereto.

16. The apparatus of claim 15, wherein each of the coefficient storage banks stores a plurality of selectable sets of the respective coefficients for application to said multipliers, thereby enabling line interpolation in spatial regions between ones of the specified plurality of video lines.

17. The apparatus of claim 16, further comprising:

a memory for storing the data of the specified plurality of video lines and the video lines of the one or more adjacent video fields; and a memory controller for writing the data to said memory and reading the data from said memory for application to at least one of the first and second pluralities of multiplier stages and the first and second one or more intermediate line storages.

18. The apparatus of claim 10, wherein the predetermined value is 1.

19. A video line generation method, comprising:

generating first product signals by multiplying data from first video lines in a first video field by predetermined first coefficients summing to a first value greater than a predetermined value;

generating second product signals by multiplying data from video lines in one or more adjacent video fields by predetermined second coefficients summing to a negative second value, the first and second coefficients together summing to the predetermined value; and generating an interpolated video line by summing the first and second product signals.

20. The method according to claim 19, further comprising modifying a specific video line in the first video field by a modifying procedure comprising:

generating a first plurality of additional product signals by multiplying data from each of a specified plurality of video lines by first additional coefficients summing to the first value, the specified plurality of video lines comprising the specific video line and video lines on opposite sides thereof in the first video field;

generating a further plurality of additional product signals by multiplying data from video lines in the one or more adjacent video fields by further additional coefficients summing to the second value; and generating a modified video line, as a weighted average of the data in the specified plurality of video lines and the video lines of the one or more adjacent video fields, by summing the first additional and further additional product signals.

21. The method of claim 20, wherein:

the first product signal generating operation comprises a first plurality of stage multiplications and one or more first intermediate line stores for multiplying the data from the first video lines by the first predetermined coefficients;

the second product signal generating operation comprises a second plurality of stage multiplications and one or more second intermediate line stores for multiplying the data of the one or more adjacent video fields by the further predetermined coefficients; and the interpolated video line generating operation comprises summing respective results of the first and second product signal generating operations.

22. The method of claim 21, wherein the video line modifying procedure further comprises:

multiplexing the first predetermined coefficients with respective ones of the first additional coefficients for input to respective ones of the first plurality of stage multiplications;

multiplexing the further predetermined coefficients with respective ones of the further predetermined coefficients for input to respective ones of the second plurality of stage multiplications.

23. The method of claim 22, further comprising:
writing the data of the specified plurality of video lines and the video lines of the one or more adjacent video fields in a memory; and
reading the data from the memory for application to at least one of the first and second pluralities of stage multiplications and the first and second one or more intermediate line stores.

24. The method of claim 21, wherein the video line modifying procedure further comprises:
storing respective ones of the coefficients in a plurality of coefficient storage banks; and
reading the coefficients from the coefficient storage banks for application in the first and second product signal generating operations.

25. The method of claim 24, wherein the coefficient storing operation further comprises storing a plurality of selectable sets of the respective coefficients for application in the first and second product signal generating operations, thereby enabling line interpolation in spatial regions between ones of the specified plurality of video lines.

26. The method of claim 25, further comprising:
writing the data of the specified plurality of video lines and the video lines of the one or more adjacent video fields in a memory; and
reading the data from the memory for application to at least one of the first and second pluralities of stage multiplications and the first and second one or more intermediate line stores.

27. The method of claim 19, wherein the predetermined value is 1.

28. A computer-readable medium encoded with a program for video line generation, said program comprising procedures for:
generating first product signals by multiplying data from first video lines in a first video field by predetermined first coefficients summing to a first value greater than a predetermined value;
generating second product signals by multiplying data from video lines in one or more adjacent video fields by predetermined second coefficients summing to a negative second value, the first and second coefficients together summing to the predetermined value; and
generating an interpolated video line by summing the first and second product signals.

29. The computer-readable medium according to claim 28, wherein said program further comprises a procedure for modifying a specific video line in the first video field, the video line modifying procedure comprising sub-procedures for:
generating a first plurality of additional product signals by multiplying data from each of a specified plurality of video lines by first additional coefficients summing to the first value, the specified plurality of video lines comprising the specific video line and video lines on opposite sides thereof in the first video field;
generating a further plurality of additional product signals by multiplying data from video lines in the one or more adjacent video fields by further additional coefficients summing to the second value; and
generating a modified video line, as a weighted average of the data in the specified plurality of video lines and the video lines of the one or more adjacent video fields, by summing the first additional and further additional product signals.

30. The computer-readable medium of claim 29, wherein:
the first product signal generating procedure comprises instructions for a first plurality of stage multiplications and one or more first intermediate line stores for multiplying the data from the first video lines by the first predetermined coefficients;
the second product signal generating procedure comprises instructions for a second plurality of stage multiplications and one or more second intermediate line stores for multiplying the data of the one or more adjacent video fields by the further predetermined coefficients; and
the interpolated video line generating procedure comprises instructions for summing respective results of the first and second product signal generating operations.

31. The computer-readable medium of claim 30, wherein the video line modifying procedure further comprises sub-procedures for:
multiplexing the first predetermined coefficients with respective ones of the first additional coefficients for input to respective ones of the first plurality of stage multiplications;
multiplexing the further predetermined coefficients with respective ones of the further predetermined coefficients for input to respective ones of the second plurality of stage multiplications.

32. The computer-readable medium of claim 31, wherein said program further comprises procedures for:
writing the data of the specified plurality of video lines and the video lines of the one or more adjacent video fields in a memory; and
reading the data from the memory for application to at least one of the first and second pluralities of stage multiplications and the first and second one or more intermediate line stores.

33. The computer-readable medium of claim 30, wherein the video line modifying procedure further comprises sub-procedures for:
storing respective ones of the coefficients in a plurality of coefficient storage banks; and
reading the coefficients from the coefficient storage banks for application in the first and second product signal generating procedures.

34. The computer-readable medium of claim 33, wherein the coefficient storing sub-procedure further comprises instructions for storing a plurality of selectable sets of the respective coefficients for application in the first and second product signal generating operations, thereby enabling line interpolation in spatial regions between ones of the specified plurality of video lines.

35. The computer-readable medium of claim 34, wherein said program further comprises procedures for:
writing the data of the specified plurality of video lines and the video lines of the one or more adjacent video fields in a memory; and
reading the data from the memory for application to at least one of the first and second pluralities of stage multiplications and the first and second one or more intermediate line stores.

36. The computer-readable medium of claim 28, wherein the predetermined value is 1.

37. A progressively scanned video signal generator, comprising:

means for generating a weighted average of first data from first video lines in a first video field and second data from second video lines in one or more adjacent video fields using first coefficients corresponding to the first data and second coefficients corresponding to the second data, the first video field corresponding to a selected phase of an interlaced video frame, a sum of the first coefficients being greater than a predetermined value, a sum of the second coefficients being negative, and a sum of the first and second coefficients being equal to the predetermined value; and means for generating a non-interlaced video frame corresponding to the interlaced video frame and including an interpolated video line generated from the weighted average.

* * * * *